United States Patent [19]

Thayer

[11] Patent Number: 4,835,785

[45] Date of Patent: May 30, 1989

[54] ISOLATOR FOR LASER OPTICAL ASSEMBLIES

[75] Inventor: William J. Thayer, Kent, Wash.

[73] Assignee: Spectra-Physics, Inc., San Jose, Calif.

[21] Appl. No.: 103,980

[22] Filed: Sep. 30, 1987

[51] Int. Cl.⁴ .................................................. H01S 3/22
[52] U.S. Cl. ..................................... 372/58; 372/98;
372/103; 372/108; 372/703; 372/59
[58] Field of Search ...................... 372/58, 92, 98, 103,
372/107, 108, 703, 59

[56] References Cited

U.S. PATENT DOCUMENTS

| | | | |
|---|---|---|---|
| 3,851,273 | 11/1974 | Hoar et al. | 372/104 |
| 3,918,800 | 11/1975 | Griffin | 372/104 |
| 4,178,078 | 12/1979 | Hausmann | 372/104 |
| 4,573,162 | 2/1986 | Bakowsky et al. | 372/58 |
| 4,612,646 | 9/1986 | Zerr | 372/58 |
| 4,672,621 | 6/1987 | Morita et al. | 372/58 |

Primary Examiner—Léon Scott, Jr.
Attorney, Agent, or Firm—Seed and Berry

[57] ABSTRACT

An optical assembly isolator and laser system incorporating the same. The isolator attaches to an end of the laser system along the optical axis of the laser system. The isolator includes a flow loop wall, an optical assembly wall, an outer wall connecting the foregoing two walls, and at least one baffle wall included in the volume defined by the outer wall. The flow loop wall and the baffle wall include open first and second apertures, and the optical assembly wall supports an optical assembly. When the isolator is in place on the laser system, the first and second apertures and the optical assembly all align with the optical axis of the laser system. The edges of the first aperture and the flow loop wall can be slanted and oriented with respect to the primary flow through the laser system to induce a small circulation and redirect any entering shock waves and entrained contaminated gas toward the outer wall. The second aperture in the baffle walls can be defined by a surface that extends toward the flow loop wall of the isolator, thereby cancelling shock and expansion waves and dissipating any shock wave energy that enters the isolator from the discharge region of the laser system. This second baffle shape also promotes flow of clean purge gas along the optical axis toward the flow loop and spoils flow of contaminated gas toward the optical assembly. Finally, the isolator can incorporate a purge gas system for tangentially injecting a purge gas adjacent the optical assembly wall and creating a series of circulations that tend to cause the contaminants to be distributed against the inner surface of the outer wall of the optical assembly. If desired, a layer of damping and packing material can be placed against the inner surface of the outer wall for the purpose of damping the shock waves and capturing contaminating particulates.

17 Claims, 3 Drawing Sheets

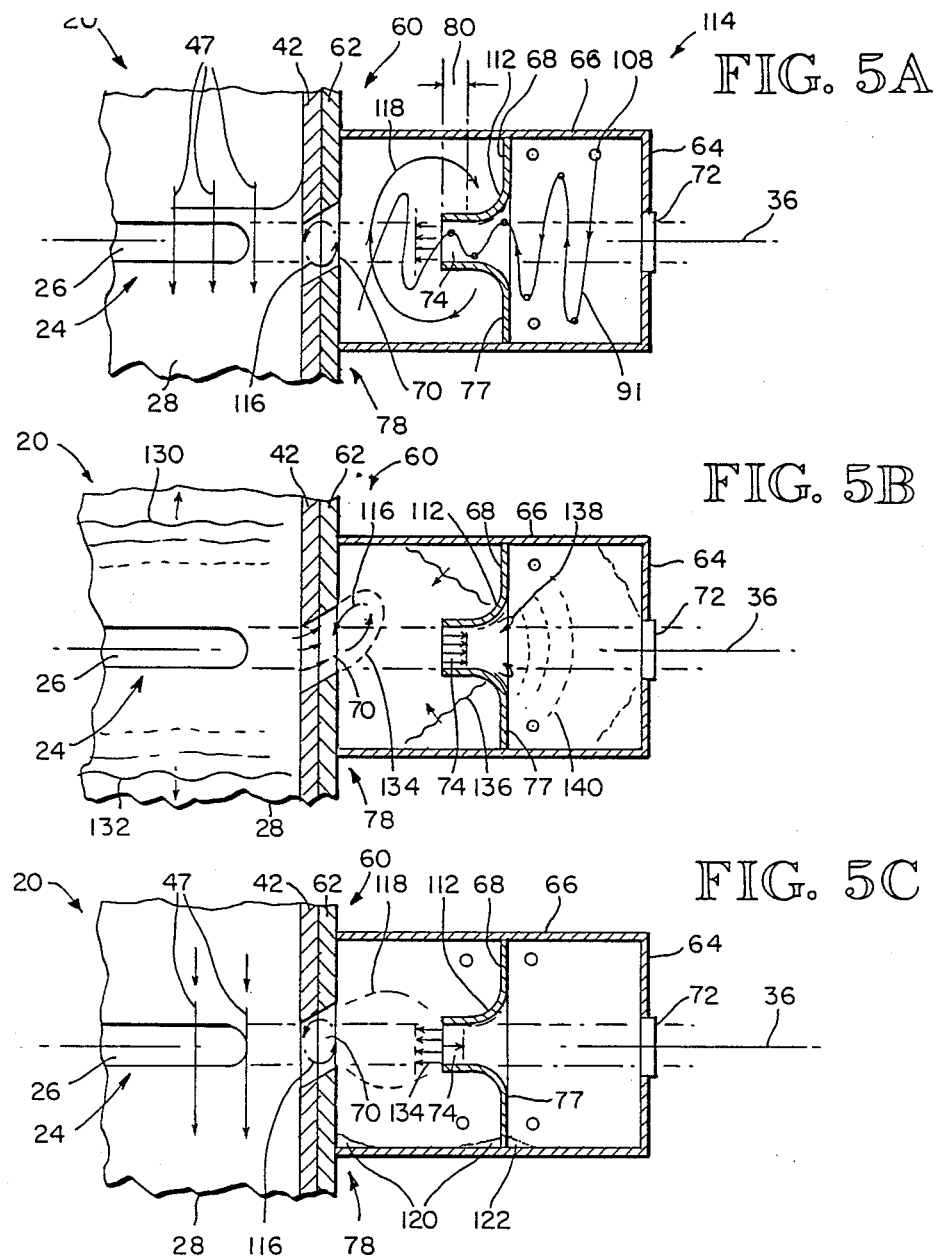

ISOLATOR FOR LASER OPTICAL ASSEMBLIES

DESCRIPTION

1. Technical Field

This invention relates to laser system optical assemblies, and more particularly, to an isolator for isolating laser system optical assemblies clear of contaminants generated in a laser discharge.

2. Background Art

Gas discharge lasers, such as excimer lasers, typically operate by exciting a gas or gas mixture, such as neon or helium with xenon and fluorine or chlorine, to a higher energy state and producing coherent light when the excited gas responds by emitting photons of a characteristic energy. The gas, which is retained under pressure in a closed vessel, is excited to its higher state by being caused to form a plasma in a discharge region located between two electrodes. Two optical assemblies, such as mirrors or windows, are located at opposite sides of the pressure vessel. At least one of the optical assemblies is partially transmissive. The optical assemblies cause the laser light beam to be reflected therebetween and define an optical axis.

The interaction of the exciting discharge with the gas in the discharge region, as well as the interaction of walls surrounding the discharge region with heat produced by the discharge, creates both shock and expansion waves and a significant amount of contaminants, such as particulates, in the discharge region. The discharge region can be swept clear of the contaminants by a primary gas flow passing transversely through the discharge region. If the gas in the discharge region or either of the laser system's optical assemblies becomes contaminated, the laser system efficiency is adversely affected. The laser system efficiency cannot be maintained unless the optical assemblies are kept clear of contaminants and the optical components are kept clean.

While a primary gas flow can keep the discharge region adequately free of contaminants, excessive contaminants eventually do become deposited on the optical assemblies, thereby requiring that they be cleaned or replaced.

A secondary purge gas flow can be generated from the optical assembly to the discharge region in order to minimize the amount of optical assembly contamination. However, the large secondary purge gas rates typically required also require complex and expensive flow circulation and purification equipment and consume considerable power. Secondary purge gas flows are, therefore, generally to be minimized.

DISCLOSURE OF THE INVENTION

It is an object of the present invention to minimize the carry-over of contaminants from the discharge region to an optical assembly of a gas laser.

It is another object of the present invention to minimize the purge flow rate required to keep the optical assemblies clean.

It is still another object of the present invention to minimize the interaction between the main flow gas and the purging gas.

It is yet another object of the present invention to provide an apparatus that can attenuate unsteady pressure and flow disturbances in the vicinity of the laser optical assemblies.

The foregoing objects can be achieved by an isolator for isolating an optical assembly from contaminants in a laser system operable to generate a laser beam along an optical axis in a discharge region. The laser includes a gas flow loop for causing a primary gas flow through the discharge region in a predetermined direction. The isolator comprises enclosure means having a first end and a second end along the optical axis. The first end is proximate the gas flow loop and has a first aperture means through it. The first aperture means is open and lies on the optical axis. The second end supports the optical assembly along the optical axis. The isolator further comprises at least one baffle means. Each baffle means is supported within the enclosure means and includes a second aperture means lying on the optical axis. The baffle means also include a wall portion extending circumferentially about the second aperture means and projecting toward the first end.

In another aspect, the invention is a laser for generating a laser beam along an optical axis. The laser system comprises a gas laser having an enclosure with first and second ends and a discharge region along the optical axis. The laser system further comprises a gas flow loop passing through the discharge region and first and second optical assemblies located along the optical axis at the first and second ends of the enclosure, both of the optical assemblies being at least partially reflective of the laser beam. Finally, the laser system comprises at least one isolator, each isolator located at an end of the gas laser and comprising a flow loop wall proximate the gas flow loop of the laser system and having a first aperture therethrough, the first aperture being open and lying on the optical axis. Each isolator further comprises an optical assembly wall for supporting an optical assembly along the optical axis, an outer wall connected between the flow loop wall and the optical assembly wall for enclosing a volume between the flow loop wall and the optical assembly wall, and at least one baffle wall connected to the outer wall within the volume enclosed by the outer wall. Each baffle wall includes a second aperture lying on the optical axis and a surface extending in the direction toward the first end.

BRIEF DESCRIPTION OF THE DRAWINGS

FIG. 5A is a partial cross-sectional schematic drawing in plan view of a first embodiment of the isolator of the present invention, showing the circulation of the purge gas flow within the isolator at a first point in its operation.

FIG. 5B is a partial cross-sectional schematic drawing in plan view of the first embodiment of the isolator of the present invention, showing a first stage of the effects of the shock and expansion waves produced in the discharge region and of the circulations of the purge gas flow.

FIG. 5C is a partial cross-sectional schematic drawing in plan view of the first embodiment of the isolator of the present invention, showing a second stage of the effects of the shock and expansion waves produced in the discharge region and of the circulations of the purge gas flow.

BEST MODE FOR CARRYING OUT THE INVENTION

Figure 1:
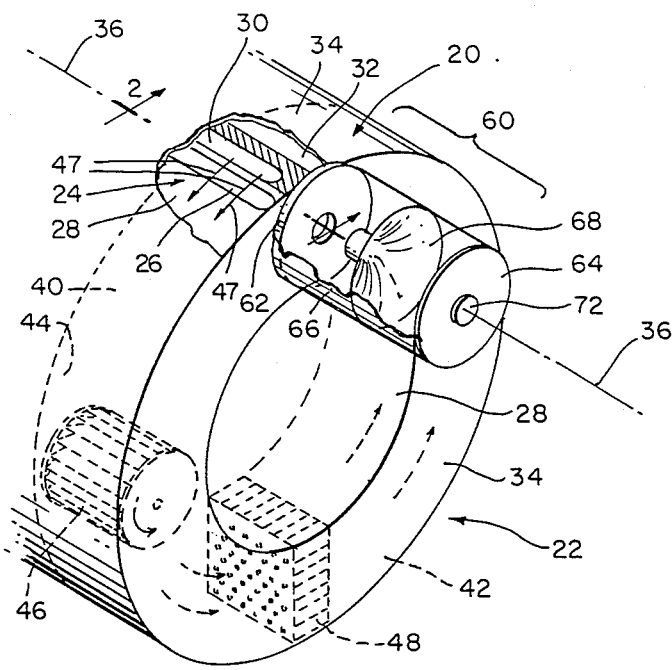
FIG. 1 is a cutaway schematic drawing in isometric view of the laser system of the present invention.

Referring to FIG. 1, an inner end 20 of a laser system 22 can be seen to include an elongated discharge region 24 containing two vertically displaced electrodes 26 and 30. The electrode 26 is a ground electrode built into an inner peripheral wall 28, and the electrode 30 is an excited electrode contained within a dielectric material 32 that forms a portion of an outer peripheral wall 34. An optical axis 36 passes coaxially through the discharge region 24, equally spaced from the electrodes 26 and 30.

The laser system 22 also includes a flow loop duct 40 that is confined between and defined by the volume between the inner and outer peripheral walls 28 and 34, a vertically oriented flow loop wall 42, and a similar vertically oriented flow loop wall 44 spaced from the wall 42, the walls 42 and 44 being located near the first and second ends, respectively, of the laser system 22. The discharge region 24 is within the flow loop duct 40.

The flow loop duct 40 further includes a fan 46, such as a cross flow fan for causing the gas contained within the volume of the flow loop duct 40 to circulate a gaseous mixture in the discharge region 24 in the direction indicated by arrows 47. The cross-sectional area of the flow loop duct 40 is generally smaller near the discharge region 24 than elsewhere along the flow loop duct. The flow loop duct 40, including the area of the discharge region 24, contains a gaseous mixture held at an elevated pressure, such as 1 to 6 atmospheres at room temperature. The flow loop duct 40 also includes a conventional heat exchanger 48 which removes heat from the circulating gas contained within the volume of the flow loop duct 40. This allows the gaseous mixture in the flow loop duct 40 to attain a steady-state temperature when the laser system 22 is in operation.

In addition, the laser system 22 includes an isolator 60 at at least one of the two ends of the laser system 22. The isolator 60, which can be composed of a sequence of separate isolator cells, includes a first end wall 62 that is adjacent the flow loop wall 42 at the inner end 20, an optical assembly end wall 64, an outer cylindrical wall 66 (shown by a cutaway view in FIG. 1), and a baffle wall 68 that is positioned between the flow loop end wall 62 and the optical assembly end wall 64, and is connected to the outer wall 66 within the volume enclosed by the outer wall. The baffle wall 68 separates the first cell from the second cell of the isolator 60. The flow loop wall end 62 contains a first aperture 70 which is open and lies on optical axis 36.

The optical assembly end wall 64 supports an optical assembly or component 72, such as a fully reflective mirror for causing the light beam generated in the discharge region 24 of the laser system 22 to be reflected back through the discharge region 24. Alternatively, the optical assembly 72 can be a partially reflective mirror for outcoupling the laser light from the laser system 22 along the optical axis 36. These components could be windows for externally located resonator optics.

The baffle wall 68 incorporates a second aperture 74 lying along the optical axis 36. The light beam produced along the optical axis 36 in the discharge region 24 passes from the discharge region 24 through the first aperture 70 and then through the second aperture 74 to the optical assembly 72. If the optical assembly 72 is fully reflective, the light beam then passes back toward the discharge region 24 through the second aperture 74 and then through the first aperture 70.

Figure 2:
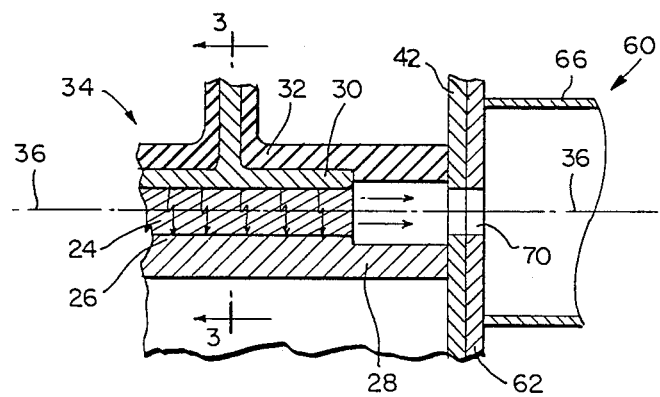
Figure 2 is a partial cross-sectional schematic drawing in elevational view of the laser system of the present invention, taken along the section lines 2—2 shown in FIG. 1.
Figure 3:
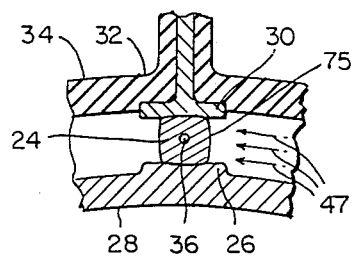
FIG. 3 is a partial cross-sectional schematic drawing of the discharge region of the laser system according to the present invention, taken along the section lines 3—3 shown in FIG. 2.

By referring now to FIGS. 2 and 3, which show a partial cross-sectional elevational view of the inner end 20 of the laser system 22, additional understanding of the interactions between the discharge region 24, the flow loop duct 40, and the isolator 60 will be gained. To cause the laser system 22 to produce a beam of laser light, the excited electrode 30 is subjected to a train of high voltage pulses with respect to the ground electrode 26. The pulses can be repeated periodically, for example, at a rate of a few up to approximately 1000 Hertz, with each voltage pulse lasting from a few nanoseconds up to tens of microseconds. The voltage pulse can have a peak voltage of approximately a few to tens of kilovolts.

In response to each voltage pulse, the gaseous mixture contained within the discharge region 24 begins to conduct a pulse of electrical current. The portion of the gaseous mixture affected by the voltage pulse between the electrodes 26 and 30 is confined within an area 75 between the two electrodes shown in the partial cross-sectional view in FIG. 3 as a rounded rectangular cross-ssectional area). The shape of rectangular area 75 is affected by the shape and spacing of the electrodes 26 and 30, as well as the gaseous mixture in the discharge region 24. The current flow through the discharge region 24 causes the gaseous mixture to enter a more excited state and, when the excited gaseous mixture loses its added energy, a pulse of light is produced. The pulse of light typically lasts a small fraction of a second.

The transfer of energy from the electrical pulse to the light pulse is not perfectly efficient. In addition to producing the light pulse, the gaseous mixture in the discharge region heats up, its absolute temperature increasing by a factor of approximately 1.5 to 2 times. As a result, the pressure of the gaseous mixture in the discharge region increases by the same factor in a time comparable to the electrical pulse, thereby creating shock and expansion waves which emanate from the discharge region 24 throughout the volume of the flow loop duct 40. While the primary flow of the gaseous mixture through the volume of the flow loop duct 40 is as shown by the arrows 47 in FIG. 3, the shock and expansion waves produced in the discharge region 24 travel both upstream and downstream with respect to the primary flow.

The electrical energy introduced by the voltage pulses, and converted to the forms of light and heat, also results in contaminants being formed. These contaminants include particulates that are produced both from the interaction of the current pulse produced between the electrodes 26 and 30 and the gaseous mixture, and from the interactions of the current and light pulses with the electrodes 26 and 30 and the dielectric material 32. The contaminants also include chemical species that can attach optical components.

If the contaminants produced by the electrical pulses were not cleared from the discharge region 24, the laser light beam produced along the optical axis 36 could be severely attenuated and the contaminants would easily migrate to the optical assembly 72. This would greatly reduce the optical efficiency of the optical assembly 72 and necessitate its frequent cleaning or replacement. The primary gas flow 47 through the discharge region 24 created by the flow loop duct 40 sweeps away the volume of contaminants produced in the discharge region in sufficient time to clear the discharge region before the next voltage pulse is generated across the electrodes 26 and 30. In order to accomplish this at a pulse repetition frequency of 1000 Hertz, for a discharge width of one to several centimeters, the primary flow rate is in the range of 1000 to 10,000 centimeters per second.

Figure 4:
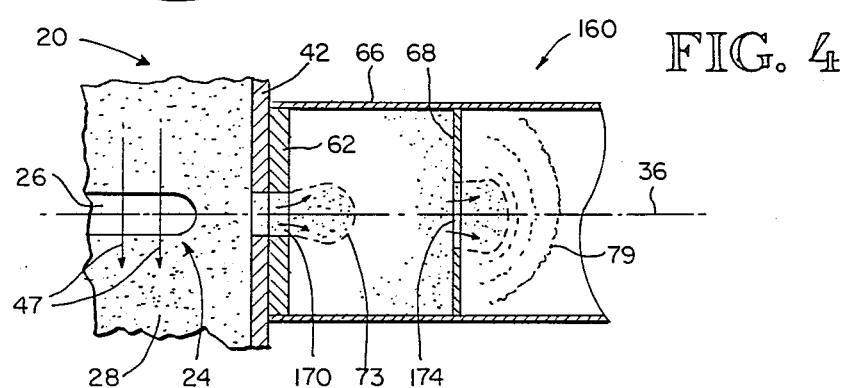
FIG. 4 is a partial cross-sectional schematic drawing in plan view of an isolator of the prior art and the discharge region of a laser system, showing the incursion of shock waves from the discharge region into the isolator.

FIG. 4 is a partial cross-sectional schematic plan view of an isolator known in the prior art and the discharge region 24 of the laser system 22. It shows the incursion of contaminated gas 73 produced in the discharge region 24 into and isolator 160 through the first aperture 170. The contaminated gas is brought through the aperture by the shock wave 79, which travels at 10 to 20 times the speed of the material being brought through the aperture 170. Despite a high-velocity primary flow 47 of the gaseous mixture through the discharge region 24, some of the shock waves produced at the discharge region 24 pass through the first flow loop wall 42 and the first aperture 170 in the flow loop wall 62 of the isolator 160 into the volume defined by the outer wall 66 of the isolator 160. Because the area of the first aperture 170 is relatively small compared to this cross-sectional area defined by the outer wall 66, only a small fraction of the energy of the shock wave 79 and the entrained gas reaches the second aperture 174 in baffle wall 68. Likewise, the incorporation of one or more baffle walls 68 into the isolator 60 substantially reduces the amount of contaminants that is carried onto the optical assembly 72 (not shown in FIG. 4).

Turning now to FIG. 5A, a first embodiment of the isolator 60 of the present invention is shown at a first point of its operation. Purge gas is injected through the tangential injection system 108 from the purge gas assembly 90 (to be discussed subsequently). The small circulation 116 in the first aperture 70 interacts with the volume of purge gas passing from the second end 114 toward the first end wall 62 of the isolator 60 to create a larger, slower circulation flow 118 between the first end wall 62 and the adjacent baffle 68. In conjunction with the circulation flow 91 caused by the tangential injection of the purge gas by injector 108, the contaminants (especially the particulates) are dispersed toward the outer wall 66, where they accumulate at the locations 120 and 122 and are prevented from reaching the optical assembly 72.

An additional feature of the isolator 60 of the present invention that reduces the amount of contaminants reaching the optical assembly 72 from the discharge region 24 is the angular orientation of the first aperture 70, shown in FIGS. 5A–5C. By arranging the first aperture 70 to be sloped toward the gas flow loop duct 40 in the predetermined direction of the gas flow 47 and with an angled orientation not perpendicular with the flow loop wall 42 and the first end wall 62, a small circulation flow indicated by arrows 116 can be established in the first aperture 70. The circulation 116 is driven by the friction of the gas flow through the flow loop duct 40 and the angle of the first aperture 70. Sloping the first aperture 70 also tends to divert the contaminated gas flow which is caused by the entering shock waves away from optical axis 36 and toward outer wall 66.

FIGS. 5B and 5C are partial cross-sectional schematic views of the first embodiment of the isolator 60 of the present invention showing stages of the effects of a subsequent shock wave. These figures illustrate the effects of the shock waves on the circulation 116 in the first aperture 70 and on the flow of gas between the first and second cells. When the voltage pulse in the discharge region 24 causes shock waves 130 and 132 to move upstream and downstream, respectively, with respect to the primary gas flow produced in the flow loop duct 40, a portion of the shock waves passes through the first aperture 70 and affects circulation 116 by transporting a small amount of the flow (shown as contaminated gas 134) from the flow loop duct 40 into the first isolator cell. The contaminated gas 134 enters the first aperture 70 and carries the small circulation 116 therewithin into the interior volume of the first isolator cell of the isolator 60 between the first end wall 62 and the leftmost baffle wall 68. The entrained contaminated gas continues toward the outer wall 66 and away from the aperture in the first baffle 68. Its direction is influenced by the angular orientation of the first aperture 70. This contaminated gas generally mixes with gas already contained within the first cell to contaminate it. The shock wave reflects to produce the reflected shock wave 136, shown in FIG. 5B returning toward the optical axis 36 from the baffle and outer wall. A small portion of the energy of the shock wave reaches the optical assembly end wall 64. This unsteady flow is dissipated in vortices indicated by arrows 138, that are created by the interaction of the unsteady flow with the diverging curved wall portion 112 of baffle wall 68. This shock wave drives an unsteady gas flow in the aperture in the flow direction toward the second cell. This effect minimizes the penetration of contaminated gas that reaches the end wall 64.

The baffle wall 68 and its aperture 74 are shaped and sized to minimize the amount of contaminating material that passes from one cell of the isolator 60 to the next. As shown by the arrows in the aperture 74 in FIG. 5B, the incursion of gas from the cell on the flow loop side of the baffle wall 68 stays within the cylindrical portion of the baffle wall 68.

The shape and size of the cells, baffle walls 68, and second aperture 74 minimize the amount of gas entrained from the main flow loop into the inner isolator cell, as driven by both steady and unsteady flow processes. The large area expansion from the first aperture 70 to the first cell diameter greatly reduces the strength of the shock wave which enters the first cell from the main flow loop. Thus, when this shock wave hits the first baffle wall 68, its strength and the amount of energy that it imparts to the gas, and hence the amount of unsteady flow that it generates through the aperture 74 to the outer cell is greatly reduced.

The shape of the baffle plate is also intended to minimize the strength of the shock wave which is transmitted into the second isolator cell. When a shock wave hits a wall, it is reflected backward toward its source, and this reflection creates a large increase in the pressure rise caused by the shock wave. This in turn can cause larger unsteady flow through the aperture 74 between the first and second isolator cells. The inward protruding cylindrical aperture of the baffle wall 68 extends a significant distance from the main portion of the baffle wall 68, and thus does not reflect the shock wave and thus eliminates the large unsteady flow and contaminate entrainment into the second cell. The distance between the inner end of the cylindrical portion of the baffle 68 to the outer, flat portion of the baffle is chosen so that the expansion wave which follows the shock wave arrives at the aperture prior to the outward gas flow. The reversed bellmouth shape of the baffle thus minimizes and spoils outward flow induced by the shock waves, tunes the arrival of reflected shock and arriving expansion waves to minimize transmitted unsteady flow effects, and organizes the purge flow to provide uncontaminated gas on and near the optical axis where it will be entrained by the shock waves in preference to contaminated gas.

FIG. 5C further shows that, at a later time, the small circulation 116 has been reestablished at its stable position within the first aperture 70, the circulation 118 has been reestablished, and the volume of contaminated gas 134 that entered the second aperture 74 of the leftmost baffle wall 68 has returned toward the first end wall 62 of the isolation 60 as the shock wave that reflected from the end wall 64 returns toward the aperture 74.

Figure 6:
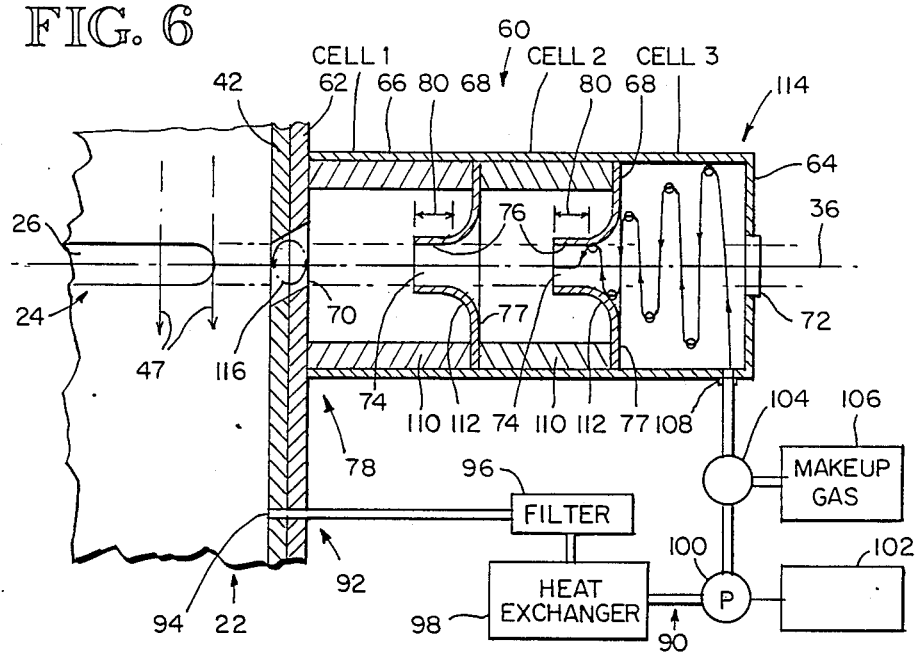
FIG. 6 is a schematic diagram of a purge gas circulation system of the present invention being used in conjunction with a first alternative embodiment of the isolator of the present invention.

With the above-described isolator 60, the contamination of the optical assembly 72 of the laser system 22 is substantially reduced, and additional measures can be taken to improve the performance of the isolator 60. FIG. 6 is a schematic diagram of a purge gas circulation system of the present invention used in conjunction with a first alternative embodiment of the isolator 60. A purge gas assembly 90 is provided for injecting a secondary gas flow 91 into the isolator 60, and includes a source of purge gas 92 supplied through a port 94 formed in the flow loop wall 42 and the first end wall 62 of the isolator 60 to receive purge gas therethrough from the primary gas flow 47 in the flow loop duct 40. The purge gas from port 94 passes through a gas filter 96 to remove any particulates and selected chemical contaminates from the purge gas, then through a heat exchanger 98 to reduce the temperature of the purge gas, and then through a gas flow pump 100 to cause circulation of the purge gas through the filter 96 and the heat exchanger 98 to the isolator 60. The gas flow pump 100 is controlled by a conventional controller 102 and is connected to a gas flow valve 104 which allows makeup gas to be introduced into the isolator 60 from a makeup gas source 106. The purge gas is injected into the isolator 60 through a tangentially arranged injector 108. The circulation tangential injector 108 is located in the outer wall 66 closed to the optical assembly end wall 64. The purge gas passes through the isolator 60 and enters the flow loop duct 40 through the first aperture 70, where it mixes with the primary gas flow 47. While the embodiment of the purge gas assembly 90 shown in FIG. 6 is a closed system, those skilled in the art will appreciate that the purge gas system could be supplied from an independent purge gas source 92, thereby rendering the purge gas assembly 90 to be an open loop system.

FIG. 6 also shows an alternative embodiment of the isolator 60 comprising the three cells. This embodiment includes two baffle walls 68, each having a central curved wall, or reversed bellmouth nozzle, portion 112 defining the second aperture 74 and tapering from the transverse wall portion 77 toward the first wall 62 of the isolator 60 and terminating in the cylindrical wall portion 76 with the axial length 80. The embodiment of the isolator 60 shown in FIG. 6 further includes liners 110, which extend interiorly, peripherally around and against the inner surface of the outer wall 66 of the isolator 60, with one disposed between the first end wall 62 and one of the baffle walls 68, and with one disposed between the two baffle walls.

The cylindrical wall portion 76 of each baffle wall 68 has its length 80 along the optical axis 36 determined by the expected strength of the shock waves that are to be introduced into the sequential cells of the isolator 60. The tapered shape of the tapered wall portion 112 of each of the baffle walls 68 can be designed to optimally minimize transmission of the shock wave energy toward the optical assembly 72 and minimize flow of contaminated gas toward the optical assembly 72. Also, since the shock wave energies decrease as they progress toward a second end 114 of the isolator 60 distant from the first end wall 62, the optimal shape for each of the two baffle walls 68 may differ. Likewise, the lengths 80 of the cylindrical wall portion 76 may differ.

The purge gas assembly 90 of the first alternative embodiment of the isolator 60, shown in FIG. 6, circulates the purge gas within the cells of the isolator at a relatively low velocity from optical assembly end wall 64 at the second end 114 toward the first end wall 62. The purge gas is optimally injected tangentially with respect to the outer wall 66, as previously noted, and transversely with respect to the optical axis 36. This creates a swirling action within the isolator 60 along its length that will tend to move any contaminating particulates outwardly toward the outer wall 66 by centrifugal action and maintain uncontaminated gas along the optical axis 36. The liners 110, which can be made from a layer of bulk damping material, can be placed against the outer walls 66 in order to dissipate shock wave energy and to trap any particulates that may be thrown toward the outer wall 66 by the swirling motion of the purge gas and to attenuate the shock waves. In addition, of course, the circulation of the purge gas by purge gas assembly 90 through the isolator 60 and out the first aperture 70 reduces the amount of contaminating material that enters the isolator 60. In practice, it has been found that a purge gas flow of approximately one centimeter per second through the first aperture 70 of the flow loop wall 62 is sufficient to eliminate contaminants passing from the discharge region 24 to the optical assembly 72.

Figure 7:
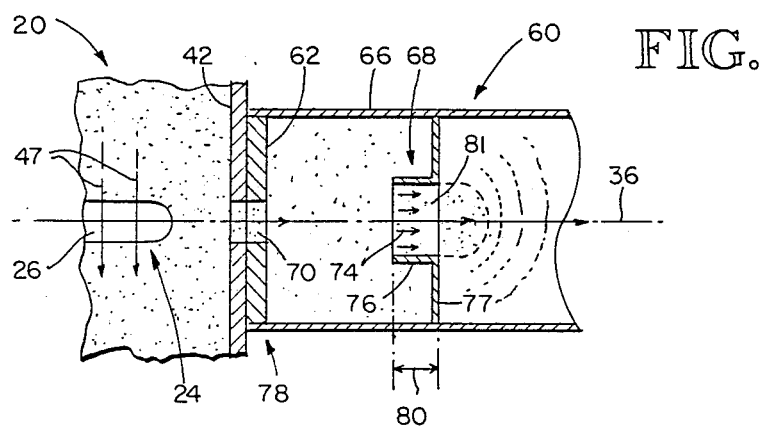
FIG. 7 is a partial cross-sectional schematic drawing in plan view of a second alternative embodiment of the isolator of the present invention and the discharge region of a laser system, showing the incursion of shock waves from the discharge system into the isolator.

FIG. 7 is a partial cross-sectional schematic plan view of a second alternative embodiment of the isolator 60 and the discharge region 24 of the laser system 22. The baffle wall 68 includes an untapered cylindrical wall portion 76 that extends around the aperture 74 and projects away from a transverse wall portion 77 of the baffle wall 68 toward the first end 78 of the isolator coaxial with the optical axis 36. An axial length of the cylindrical wall portion 76 of the baffle wall 68, indicated by double-headed arrow 80, is chosen to be longer than the expected travel of the gas interface 81 between the inner and outer cells once the shock wave reaches baffle wall 68 in response to a spark discharge in the discharge region 24. By means of cylindrical wall portion 76, the likelihood of contaminants passing through the second aperture 74 and, ultimately, to the optical assembly 72 is even further reduced.

One skilled in the art will recognize that various modifications of the features of the optical and laser system of the present invention can be made without departing from the spirit and scope of the invention. In particular, it will be recognized by one skilled in the art that a laser system comprising a second isolator 60 disposed toward the other end of the laser system 22 (opposing inner end 20 along optical axis 36) will similar greatly reduce the amount of contamination of the optical assembly located at that other end. In addition, the isolator can be extended by adding more baffle walls between the flow loop wall 62 and the optical assembly wall 64. Accordingly, the spirit and scope of the present invention are to be limited only by the following claims.

I claim:

1. An isolator cell for isolating an optical assembly from contaminants in a laser system which generates a pulsed laser beam along an optical axis in a discharge region and including a gas flow loop for causing a primary gas flow through the discharge region, the isolator comprising:

enclosure means having a first end and a second end disposed along the optical axis, the first end being proximate the gas flow loop of the laser system and having a first aperture means therethrough, the first aperture means being open and lying on the optical axis, the second end supporting the optical assembly along the optical axis; and at least one baffle means for attenuating shock wave energy and minimizing unsteady flow of contaminants toward the optical assembly, each said baffle means being supported within the enclosure means and including a second aperture means lying on the optical axis and a wall portion extending circumferentially about the second aperture means and projecting toward the first end.

2. The isolator of claim 1 wherein the first aperture means is shaped to interact with the primary gas flow to produce a flow circulation zone within the first aperture means.

3. The isolator of claim 2, further comprising injection means for injecting a secondary gas flow between the second end of the enclosure means and the baffle means located closest thereto, the secondary gas flow being injected tangentially to the enclosure means.

4. The isolator of claim 1 wherein the baffle means attenuates shock wave energy passing from the direction of the first end toward the second end of the enclosure means.

5. An isolator for isolating an optical assembly from contaminants in a laser system which generates a pulsed laser beam along an optical axis in a discharge region and including a gas flow loop for causing a primary gas flow through the discharge region, the isolator comprising:

a flow loop wall at a first end, the flow loop wall being proximate the gas flow loop of the laser system and having a first aperture therethrough, the first aperture being open and lying on the optical axis;

an optical assembly wall at a second end for supporting the optical assembly along the optical axis;

an outer wall extending between the first and second ends and enclosing a volume between the flow loop wall and the optical assembly wall; and at least one baffle wall connected to the outer wall within the volume enclosed by the outer wall, each said baffle wall including a second aperture lying on the optical axis and a wall portion extending circumferentially about the second aperture and projecting toward the first end to simultaneously attenuate and cancel shock and expansion waves generated by the pulsed discharge and to spoil unsteady flow of contaminated gas which is driven in pulses into the isolator by the discharge.

6. The isolator of claim 5 wherein the first aperture has a length and a shape to interact with the primary gas flow to produce a flow circulation zone within the first aperture.

7. The isolator of claim 6 wherein the first aperture projects through the flow loop wall at an angle offset from the optical axis and is sloped toward the gas flow loop in the predetermined direction of gas flow.

8. The isolator of claim 5, further comprising means for injecting a secondary gas flow within the volume enclosed by the outer wall, the secondary gas flow being injected between the optical assembly wall and the nearest baffle wall, tangential to the wall portion.

9. The isolator of claim 8 wherein the means for injecting the secondary gas flow is oriented to inject the gas in a plane that is perpendicular to the optical axis.

10. The isolator of claim 8 wherein the means for injecting a secondary gas flow comprises:

secondary gas flow supply means;

a gas filter connected to the secondary gas flow supply means;

a heat exchanger connected to the gas filter;

a gas flow pump connected to the heat exchanger; and an injector to receive the secondary gas from the pump and inject the secondary gas through the outer wall of the isolator cell.

11. The isolator of claim 10 wherein the secondary gas flow supply means is connected to the flow loop wall and receives a portion of the primary gas flow from the gas flow loop to supply the secondary gas flow.

12. The isolator of claim 8, further comprising makeup gas means for providing a makeup gas to the means for injecting a secondary gas flow.

13. The isolator of claim 5 wherein the wall portion of at least one baffle wall has a large axial radius of curvature that curves in the direction toward the first end, the wall being tapered to promote uniform flow toward the gas flow loop and to disrupt flow toward the optical assembly.

14. The isolator of claim 13 wherein the tapered baffle wall portion is shaped to both cancel and attenuate shock wave energy passing through the tapered baffle wall portion in the direction from the flow loop wall toward the optical assembly wall.

15. The isolator of claim 5 wherein at least a portion of an inner surface of the outer wall is covered by a layer of packing or acoustical damping material.

16. The isolator of claim 15 wherein the portion of the inner surface of the outer wall is between the flow loop wall and the baffle wall nearest the optical assembly wall.

17. A laser system for generating a pulsed laser beam along an optical axis, comprising:

a gas laser having an enclosure with first and second ends along the optical axis and having a discharge region along the optical axis;

a gas flow loop passing through the discharge region;
first and second optical assemblies located along the optical axis at the first and second ends of the enclosure, both of said optical assemblies being at least partially transmissive of the laser beam; and
at least one isolator, each said isolator located at an end of the gas laser and including:
 a flow loop wall proximate the gas flow loop of the laser system and having a first aperture therethrough, the first aperture being open and lying on the optical axis;
 an optical assembly wall for supporting an optical assembly along the optical axis;
 an outer wall connected between the flow loop wall and the optical assembly wall, the outer wall enclosing a volume between the flow loop wall and the optical assembly wall; and
 at least one baffle wall connected to the outer wall within the volume enclosed by the outer wall, each baffle wall including a second aperture lying on the optical axis and a surface extending in the direction toward the first end.

* * * * *